United States Patent
Lee et al.

(10) Patent No.: US 8,520,273 B2
(45) Date of Patent: Aug. 27, 2013

(54) A4-SIZE SCANNER HAVING FUNCTION OF SCANNING A3 DOCUMENT AND SCANNING METHOD THEREOF

(75) Inventors: Byoung Bag Lee, Seoul (KR); Nam Ik Cho, Seoul (KR); Sung Hoon Lee, Seongnam-si (KR)

(73) Assignee: Sindoh Co., Ltd. (KR)

( * ) Notice: Subject to any disclaimer, the term of this patent is extended or adjusted under 35 U.S.C. 154(b) by 971 days.

(21) Appl. No.: 12/567,812

(22) Filed: Sep. 28, 2009

(65) Prior Publication Data

US 2010/0296130 A1  Nov. 25, 2010

(30) Foreign Application Priority Data

May 19, 2009   (KR) ................... 10-2009-0043483
May 19, 2009   (KR) ................... 10-2009-0043484

(51) Int. Cl.
*H04N 1/40* (2006.01)

(52) U.S. Cl.
USPC ........................................ 358/498; 358/497

(58) Field of Classification Search
USPC .......... 358/497–498, 296, 1.2, 528, 449–452, 358/1.9, 2.1, 468
See application file for complete search history.

(56) References Cited

U.S. PATENT DOCUMENTS

| | | | | | |
|---|---|---|---|---|---|
| 5,841,549 | A | * | 11/1998 | Munakata | 358/296 |
| 6,002,492 | A | * | 12/1999 | Kamon et al. | 358/450 |
| 6,507,415 | B1 | * | 1/2003 | Toyoda et al. | 358/450 |
| 6,690,482 | B1 | * | 2/2004 | Toyoda et al. | 358/1.2 |

* cited by examiner

*Primary Examiner* — Thomas D Lee
*Assistant Examiner* — Stephen M Brinich
(74) *Attorney, Agent, or Firm* — Harness, Dickey & Pierce, P.L.C.

(57) ABSTRACT

An A4-size scanner capable of scanning an A3 document. The A4-size scanner includes a scanning part, a transferring roller member that is disposed at an upper side of the flat glass to be orthogonal to a length direction of the automatic document feeding unit and the scanning sensor so that the document having a double size of a scanning capacity of the scanning sensor and introduced onto the flat glass in the length direction of the automatic document feeding unit and the scanning sensor is transferred to a transferring roller, and a transferring roller member driving motor that is connected with the transferring roller which dividedly scans the document having a larger size than the scanning capacity of the scanning sensor; and an image processing part which performs an image processing for composing two images which are dividedly scanned through the scanning part.

11 Claims, 22 Drawing Sheets

PRIOR ART

A4-SIZE SCANNER HAVING FUNCTION OF SCANNING A3 DOCUMENT AND SCANNING METHOD THEREOF

CROSS-REFERENCE TO RELATED APPLICATIONS

The present invention claims priority of Korean Patent Application Nos. 10-2009-0043483 filed on May 19, 2009 and 10-2009-0043484 filed on May 19, 2009, which are incorporated herein by reference.

BACKGROUND OF THE INVENTION

1. Field of the Invention

The present invention relates to a scanner and, more particularly, to an A4-size scanner having a function of scanning an A3 document, which can scan the A3 document, and a scanning method thereof.

2. Description of Related Art

Generally, a scanner (an image forming apparatus) is a device for printing an input image signal on a printing medium, and classified into a printer, a duplicator, a multi-function printer in which the functions thereof are combined in a single body, and the like.

The scanner includes a scanning part for scanning an image recorded on a document. In order for the scanning part to read information from the document, it is necessary to move a scanning sensor of the scanning part or the document.

Herein, there are two types for scanning the document, one is a flat bed type in which the scanning sensor is moved in a state that the document is fixed, and the other is a sheet feed type in which the document is moved in a state that the scanning sensor is fixed. Recently, the multi-function printer employs the above-mentioned two types, and FIG. 1 shows an example of such scanner.

As shown in FIG. 1, the scanner 50 includes a cover 10 and a main body 30. An automatic document feeder 20 is disposed at the cover 10, and a scanning sensor 40 is disposed at the main body 30 to scan a document fed from the automatic document feeder 20.

The scanning sensor 40 may include a CCM module (CCDM) having a charge coupled device as one of image pickup devices which forms an image of a subject using an electric charge, and a CMOS image sensor (CIS) which scans the document.

The automatic document feeder 20 has a C-shaped passage P for feeding the documents. The documents loaded on a document platform 21 are guided to an upper side of the scanning sensor 40 through a pickup roller 22, a transferring roller 23 and a feeding roller 24. Then, the documents are scanned by the scanning sensor 40 and discharged through a discharging roller 25.

As described above, it is possible to facilely scan a large amount of documents using the automatic document feeder 20.

Further, the document may be scanned without the automatic document feeder 20. To this end, after opening the cover 10, the document is aligned on flat glass 31 disposed at an upper surface of the main body 30 and the scanning operation is performed. Then, the scanning sensor 40 is reciprocated at a lower side of the scanning window in an arrow direction A.

Therefore, while the scanning sensor 40 is moved, a single sheet of the document can be scanned without the automatic document feeder 20.

Meanwhile, in the conventional multi-function printer, since the scanning sensor 40 is set on the basis of an A4 size which is most widely used, a scanner for the A3 size is needed to scan an A3-sized document which is larger than the A4 size.

However, since the scanner for the A3 size has a scanning sensor twice larger than that of a scanner for the A4 size, the increase in the size of the scanner results in increase in a cost of the product. Thus, it is difficult to separately purchase the scanner for the A3 size, which has a low frequency of use.

SUMMARY OF THE INVENTION

An embodiment the present invention is directed to providing an A4-size scanner having a function of scanning an A3 document, which can scan the A3 document, and a scanning method thereof.

To achieve the object of the present invention, the present invention provides an A4-size scanner having a function of scanning an A3 document, which comprises a main body, an automatic document feeding unit that is disposed at one side of the main body, a cover for opening and closing the main body, and a flat glass that is formed at an upper portion of the main body so as to load a document, including a scanning part which comprises a scanning sensor that is disposed in the main body so as to scan the document loaded on the flat glass, a transferring roller member that is disposed at an upper side of the flat glass to be orthogonal to a length direction of the automatic document feeding unit and the scanning sensor so that the document having a double size of scanning capacity of the scanning sensor and introduced onto the flat glass in the length direction of the automatic document feeding unit and the scanning sensor is transferred to a transferring roller, and a transferring roller member driving motor that is connected with the transferring roller member so as to transmit driving force, and which dividedly scans the document having a larger size than the scanning capacity of the scanning sensor; and an image processing part which performs an image processing for composing two images which are dividedly scanned through the scanning part.

Preferably, the scanning part further comprises a document scanning button which outputs a signal for scanning the document loaded on the flat glass and a controlling part which receives a signal from the document scanning button and outputs a signal for driving the scanning sensor and the transferring roller member driving motor, wherein the controlling part outputs the signal to the scanning sensor and the transferring roller member driving motor according to the signal of the document scanning button.

Preferably, the scanning part further comprises a document size detecting sensor which is disposed at a document input port so as to detect a size of the document introduced onto the flat glass, wherein the controlling part outputs a signal to the scanning sensor and the transferring roller member driving motor according to the signal of the document scanning button and a result detected by the document size detecting sensor so that the document loaded on the flat glass is selectively and dividedly scanned.

Preferably, the scanning sensor scans a half or more of the document in case of dividedly scanning the document so that an overlapped portion in which the scanned images are overlapped with each other is formed.

Preferably, a document input portion and a document output portion are respectively formed at upper and lower end portions of the cover so as to introduce and discharge the document transferred by the transferring roller member.

Preferably, the main body includes a supporting flap which is provided at a lower side of the flat glass so as support the document introduced perpendicularly to a length direction of the automatic document feeding unit and the scanning sensor Preferably, the transferring roller member is interlocked with the transferring roller disposed in the automatic document feeding unit.

Further, the present invention provides a scanning method of the A4-size scanner having the function of scanning an A3 document, including the steps of a) aligning a short side portion of a document on a flat glass; b) pushing a document scanning button; c) outputting a signal from a controlling part to a scanning sensor so as to scan a part of the document loaded on the flat glass according to a signal from the document scanning button; d) outputting a signal from the controlling part to a transferring roller member driving motor so that the rest part of the document that is not yet scanned is loaded on the flat glass; e) outputting a signal from the controlling part to the scanning sensor so as to scan the rest part of the document; and f) performing an image processing in an image processing part so as to compose two images scanned by the scanning sensor.

Preferably, the scanning method further includes the step of detecting a size of the document aligned on the flat glass by a document size detecting sensor between the steps b and c, wherein the controlling part carries out the steps of c, d, e and f, if the document aligned on the flat glass has a larger size of a scanning capacity of the scanning sensor.

Preferably, the scanning sensor scans a half or more of the document so that an overlapped portion in which the scanned images are overlapped with each other is formed.

Further, the present invention provides an A4-size scanner having a function of scanning an A3 document, which comprises a main body having a flat glass on which a document is loaded, and a cover for opening and closing the main body, comprising a scanning part which dividedly scans the document having a larger size than a scanning capacity, and which comprises a scanning sensor that is disposed in the main body so as to scan the document; an automatic document feeding unit having a transferring roller member which is provided at a rear side of the cover and comprised of a plurality of rollers, a document feeding port and a document discharging port which are formed at a rear side of the automatic document feeding unit to be parallelly formed up and down, and a document exposing port which is formed at a front side of the automatic document feeding unit so that a part of the document fed through the document feeding port is exposed to an outside of the flat glass; and a transferring roller member driving motor which transmits driving force to the transferring roller member so that the transferring roller member is rotated forwardly and reversely; and an image processing part which performs an image processing for composing two images which are dividedly scanned through the scanning part.

Preferably, the transferring roller member comprises a feeding roller which is disposed to be adjacent to the document feeding and a transferring roller which is disposed to be adjacent to the document exposing port, and the transferring roller is rotated forwardly and reversely by the transferring roller member driving motor so that the fed document is transferred to the document exposing port or the document discharging port.

Preferably, the scanning port comprises document scanning button which outputs a signal for scanning the document loaded at the document feeding port; and a controlling part which receives a signal from the document scanning button and outputs a signal for operating the scanning sensor and the transferring roller member driving motor, wherein the controlling part outputs a signal to the scanning sensor and the transferring roller member driving motor according to the signal from the document scanning button so that the document loaded on the flat glass is dividedly scanned.

Preferably, the scanning part further comprises a document size detecting sensor which is disposed at a document input port so as to detect a size of the document introduced onto the flat glass, and the controlling part outputs a signal to the scanning sensor and the transferring roller member driving motor according to the signal of the document scanning button and a result detected by the document size detecting sensor so that the document loaded on the flat glass is selectively and dividedly scanned.

Preferably, the scanning sensor scans a half or more of the document in case of dividedly scanning the document so that an overlapped portion in which the scanned images are overlapped with each other is formed.

Further, the present invention provides a scanning method of an A4-size scanner having a function of scanning an A3 document of any one of claims 11 to 15, comprising the steps of a) aligning a short side portion of a document on a document feeding port; b) pushing a document scanning button; c) outputting a signal from a controlling part to a transferring roller member driving motor according to a signal of the document scanning button so that a part of the document aligned at the document feeding port is closely contacted with the flat glass; d) outputting signal from the controlling part to a scanning sensor so as to scan the part of the document loaded on the flat glass; e) outputting a signal from the controlling part to the transferring roller member driving motor so that the rest part of the document that is not yet scanned is loaded on the flat glass; f) outputting a signal from the controlling part to the scanning sensor so as to scan the rest part of the document; and g) performing an image processing in an image processing part so as to compose two images scanned by the scanning sensor.

Preferably, the scanning method of claim 16, further comprising the step of detecting a size of the document aligned on the flat glass by a document size detecting sensor between the steps of b and c, wherein the controlling part carries out the steps of c, d, e, f and g, if the document aligned on the flat glass has a larger size of a scanning capacity of the scanning sensor.

Preferably, the scanning sensor scans a half or more of the document so that an overlapped portion in which the scanned images are overlapped with each other is formed.

DESCRIPTION OF SPECIFIC EMBODIMENTS

The advantages, features and aspects of the invention will become apparent from the following description of the embodiments with reference to the accompanying drawings, which is set forth hereinafter.

First Embodiment

Figure 1:
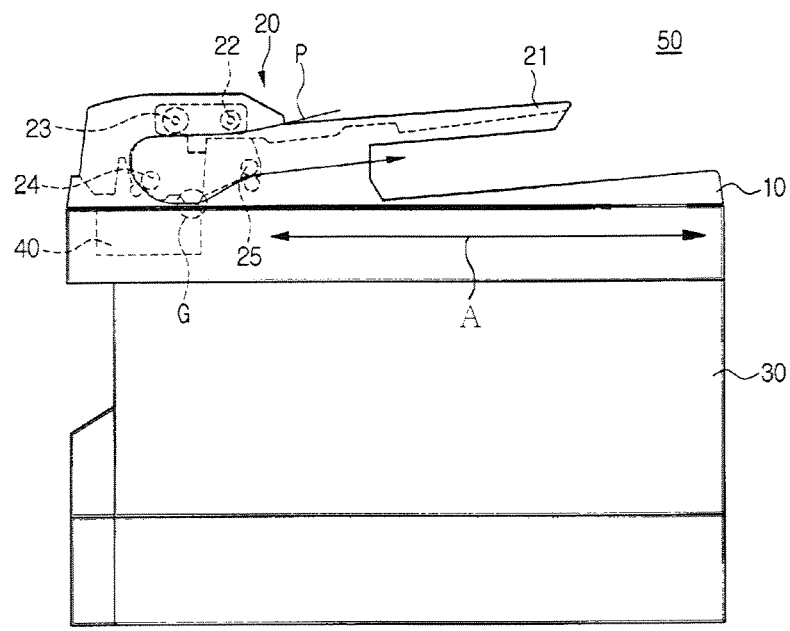
FIG. 1 is a view of an example of a conventional scanner.
Figure 2:
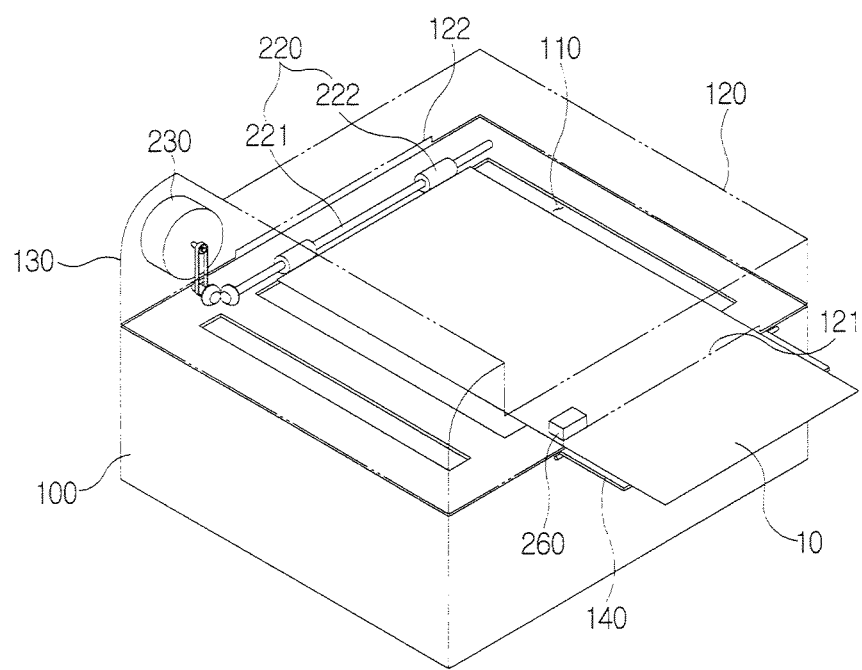
FIG. 2 is a schematic view of an A4-size scanner with a function of scanning an A3 document in accordance with a first embodiment of the present invention.
Figure 3:
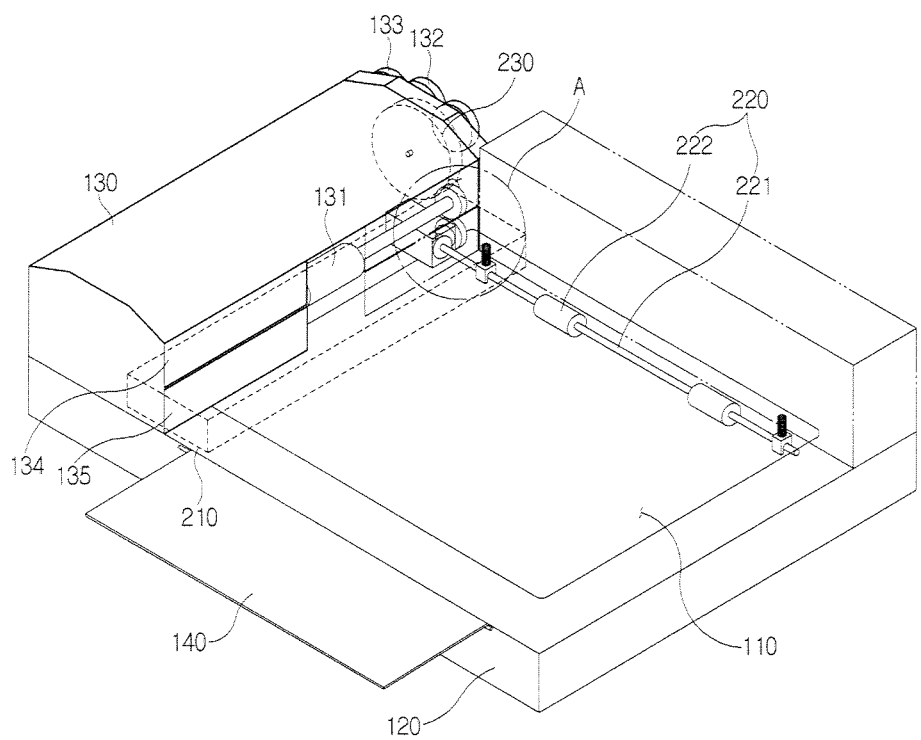
FIG. 3 is a view showing an upper side of the A4-size scanner with the function of scanning an A3 document in accordance with the first embodiment of the present invention.
Figure 3A:
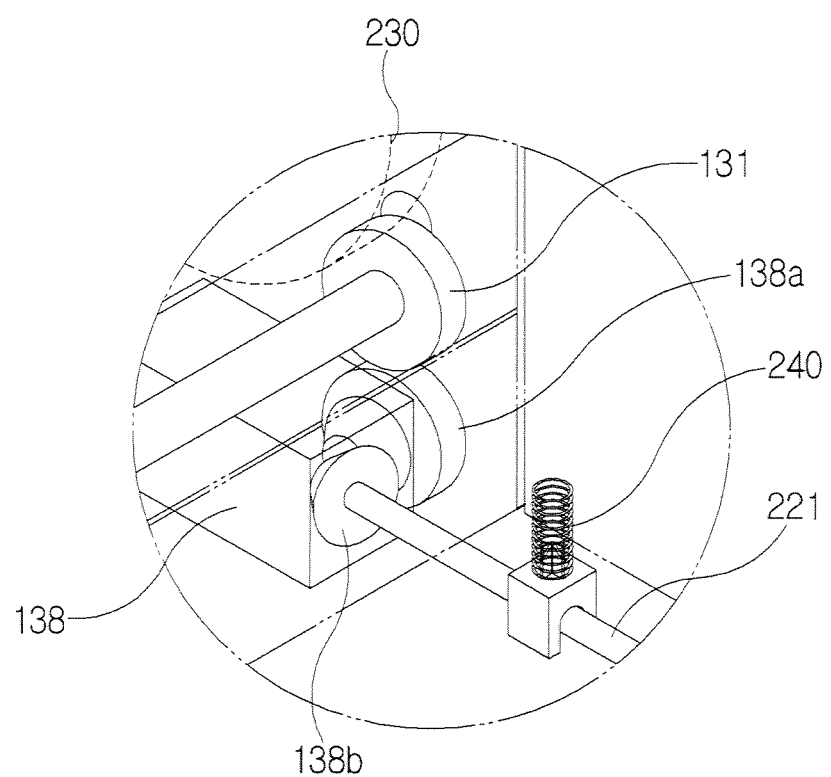
FIG. 3a is an enlarged view of a part A of FIG. 3.
Figure 4:
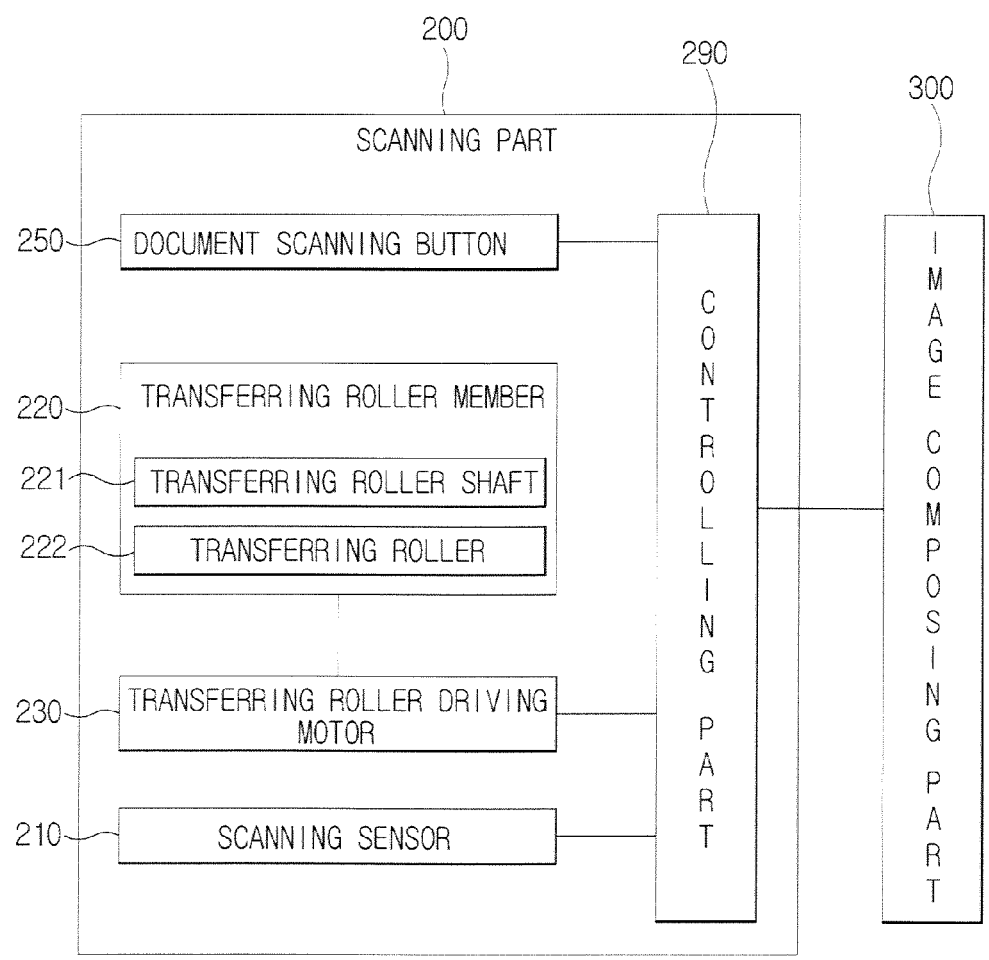
FIG. 4 is a schematic block diagram showing one type of a scanning part of the A4-size scanner with the function of scanning the A3 document in accordance with the first embodiment of the present invention.

FIG. 2 is a schematic view of an A4-size scanner with a function of scanning an A3 document in accordance with a first embodiment of the present invention, FIG. 3 is a view showing an upper side of the A4-size scanner with the function of scanning an A3 document in accordance with the first embodiment of the present invention, FIG. 3a is an enlarged view of a part A of FIG. 3, and FIG. 4 is a schematic block diagram showing one type of a scanning part of the A4-size scanner with the function of scanning the A3 document in accordance with the first embodiment of the present invention.

As shown in FIGS. 2 to 4, the 4-size scanner with the function of scanning the A3-sized document in accordance with the first embodiment of the present invention includes an main body 100 having a flat glass 110 on which a document is loaded and a cover 120 for opening and closing the flat glass 110 disposed at an upper side of the main body 100 and in which an automatic document feeding unit 130 is provided at one side thereof, and also includes a scanning part 200 which dividedly scans a document and an image processing part 300 for composing images which are dividedly scanned through the scanning part 200.

The scanning part 200 includes a scanning sensor 210, a transferring roller member 220 and a transferring roller member driving motor 230.

The scanning sensor 210 includes a CCDM or CIS (CMOS Image Sensor) as a COD module. And as shown in FIGS. 2 and 3, the scanning sensor 210 is disposed at a left upper side of the main body 100, detailedly, a lower side of the automatic document feeding unit 130 so as to scan the document fed from the automatic document feeding unit 130. Further, the scanning sensor 210 is reciprocated left and right so as to scan the document 10 loaded on the flat glass 110.

In general, the scanning sensor 210 is designed to be corresponding to a length (210 mm) of a short side portion of an A4 document. That is, the scanning sensor 210 is designed to scan the document along a long side portion (297 mm) of the A4 document in a status of being aligned to be parallel with the short side portion (210 mm) of the A4 document.

Meanwhile, the automatic document feeding unit 130 is disposed at a left side of the cover 120, i.e., at an upper side of the scanning sensor 210 so as to automatically feed and discharge a large amount of documents. In detail, the automatic document feeding unit 130 has a plurality of transferring rollers 131, 132 and 133 and discharges the documents fed through a feeding part 134 to the outside through a discharging part 135.

At this time, the scanning sensor 210 is fixed at lower side of the automatic document feeding unit 130 so as to scan the fed documents. Therefore, the documents are scanned without being loaded on the flat glass 110.

Further, the 4-size scanner with the function of scanning the A3-sized document in accordance with the first embodiment of the present invention includes the transferring roller member 220 which is separately provided from the rollers disposed in the automatic document feeding unit 130, and the transferring roller member driving motor 230.

The transferring roller member 220 is arranged to be orthogonal to a length direction of the automatic document feeding unit 130 and the scanning sensor 210, i.e., arranged in a transverse direction on an upper side of the flat glass 110.

More detailedly, the transferring roller member 220 includes a transferring roller shaft 221 which is disposed in a transverse direction on the upper side of the flat glass 110, and a plurality of transferring rollers 222 which are rotatably disposed at the transferring roller shaft 221.

The transferring roller member 220 having the above-mentioned construction is operated so that the document 10 introduced onto the flat glass 110 in a length direction of the automatic document feeding unit 130 and the scanning sensor 210 is transferred to the transferring rollers 222.

For example, if the transferring roller member 220 is operated in a state that a short side portion of an A3 document 10 is aligned on the flat glass 100 in order to scan the A3 document 10, the A3 document 10 is transferred to the transferring roller member 220 by rotation of the transferring rollers 222.

Further, the transferring roller member driving motor 230 is connected with the transferring roller member 220, i.e., the transferring roller shaft 221 so as to transmit driving force to the transferring roller shaft 221, such that the transferring rollers 222 are rotated.

At this time, after an upper portion of the A3 document 10 on the flat glass 110 is scanned by the scanning sensor 210, the transferring roller driving motor 230 transmits the driving force to the transferring roller member 220 so that the rest part of the A3 document 10 which is not yet scanned is positioned on the flat glass 110.

Therefore, the scanning sensor 210 can scan the entire parts of the A3 document 10, while being reciprocated twice. In other words, using the A4-size scanning sensor, it is possible to scan the A3 document having a double size of a scanning capacity of the scanning sensor.

The image processing part 300 carries out an image processing for composing two images (A4-size images) scanned through the scanning part 200 and then generates a scanned image of the A3 size.

As described above, the A4-size scanner having the function of scanning an A3 document in accordance with the first embodiment of the present invention can scan the A3 document using the existing (A4-size) scanning sensor.

Meanwhile, in the main body 100, a supporting flap 140 may be provided at a lower side of the flat glass 110, i.e., at an opposite end to the transferring rollers 222 in order to support the A3 document. In other words, the supporting flap 140 functions to support a part of the A3 document 10 which is exposed to the outside of the main body 100 while being introduced onto the flat glass 110 to be orthogonal to the length direction of the automatic document feeding unit 130 and the scanning sensor 210.

Preferably, a lower end of a lower side of the cover 120, i.e., a lower end adjacent the supporting flap 140, there may be formed a document input port 121 which is formed into a desired space so that the A3 document 10 is facilely introduced onto the flat glass 110 without being caught by the end of the cover 120.

Further, at a lower end of an upper side of the cover 120, i.e., a lower end adjacent to transferring roller member 220, there may be formed a document output port 122 which is formed into a desired space so that the A3 document is facilely introduced onto the flat glass 110 without being caught by the end of the cover 120.

Owing to the document input port 121 and the document output port 122, a user can input or output the document to/from the flat glass 110 without opening and closing the cover 120.

Meanwhile, the automatic document feeding unit 130 has a plurality of transferring rollers 131, 132 and 133 for automatically feeding the A4 document, and the transferring roller member driving motor 230 transfers the driving force to the transferring rollers 131, 132 and 133. The transferring roller member 220 of the present invention is connected with one of the transferring rollers 131, 132 and 133.

In detail, the transferring roller member 220 for feeding the A3 document is connected with the transferring roller 131 which is the most adjacent to the flat glass 110. The transferring roller member 220 and the transferring roller 131 are connected with each other through a pair of bevel gears 138a and 138b (or worm gears) that are engaged with each other in a gear box 138.

One part of the first bevel gear 138a out of the pair of bevel gears 138a and 138b disposed in the gear box 138 is vertically engaged with the second bevel gear 138b, and the other part is exposed to an outside of the gear box 138 so as to be parallelly engaged with the transferring roller 131 of the automatic document feeding unit 130. Further, the second bevel gear 138b is formed at an end of the transferring roller shaft 221 and vertically engaged with the first bevel gear 138a.

Therefore, if the transferring roller member driving motor 230 is driven, the transferring roller 131 of the automatic document feeding unit 130 is rotated, and the first and second bevel gears 138a and 138b engaged with each other are rotated by rotation of the transferring roller 131, and thus the transferring roller shaft 221 is rotated.

If only the A4 document is scanned using the automatic document feeding unit 130, a spring member 240 may be provided so as to exert elastic force upward and downward on the transferring roller shaft 221 so that the transferring roller member 220 is not rotated and only the transferring roller 131 in the automatic document feeding unit 130 is rotated.

Therefore, in case of scanning the A4 document, the spring member 240 is expanded so that the first bevel gear 138a is not engaged with the transferring roller 131 of the automatic document feeding unit 130. In case of scanning the A3 document, the spring member 240 is compressed so that the first bevel gear 138a is engaged with the transferring roller 131 of the automatic document feeding unit 130. Therefore, the transferring roller 220 is selectively connected with the transferring roller 131 of the automatic document feeding unit 130.

Figure 5:
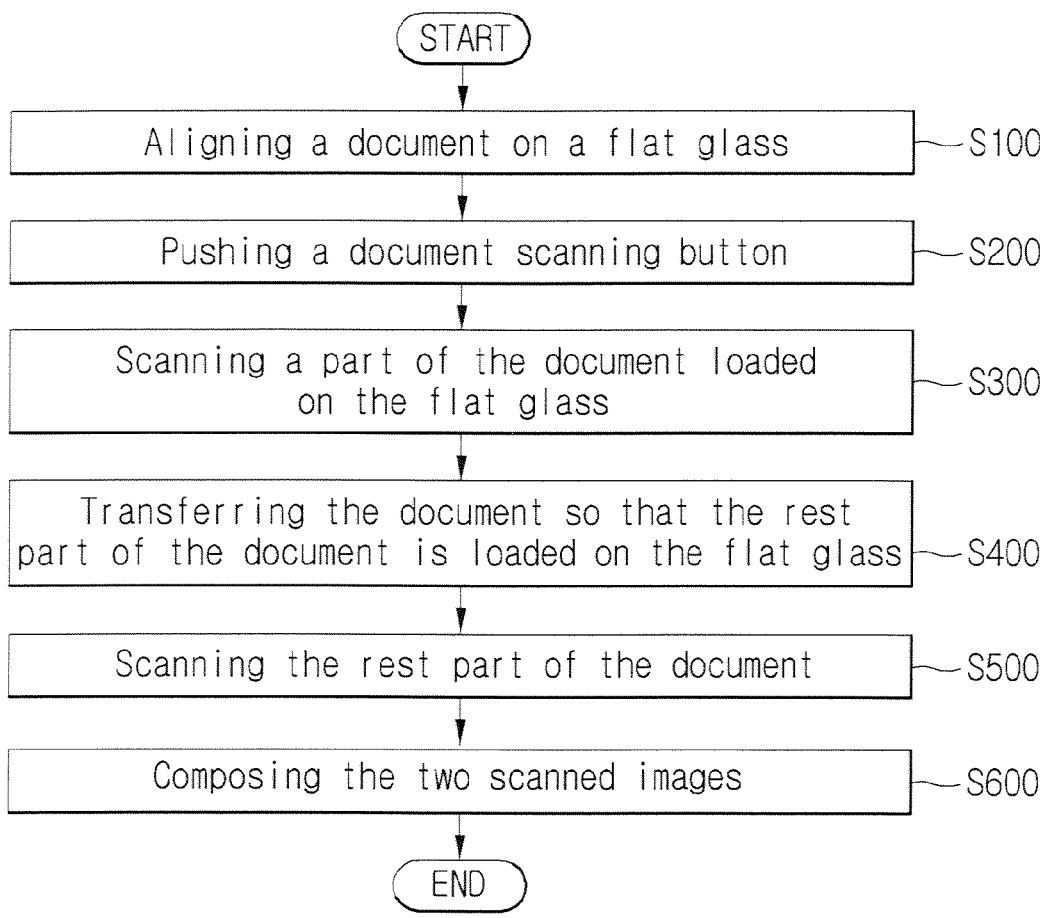
FIG. 5 is a flow chart showing a scanning method of the A4-size scanner with the function of scanning the A3 document in accordance with the first embodiment of the present invention.

FIG. 5 is a flow chart showing a scanning method of the A4-size scanner with the function of scanning the A3 document in accordance with the first embodiment of the present invention.

As shown in FIGS. 2 to 5, the scanning part 200 of the A4-size scanner with the function of scanning the A3 document in accordance with the first embodiment of the present invention further includes a document scanning button 250 which outputs a signal for performing the function of scanning the A3 document and a controlling part 290 which outputs a signal to the scanning part 200 so as to scan the A3 document according to the signal from the document scanning button 250.

Although not shown in the drawings, the document scanning button 250 is provided at one side of the main body 100 to be pushed by a user so that the A3 document is scanned. The document scanning button 250 functions to output the signal to the controlling part 290 so that the A3 document loaded on the flat glass 110 through the document input port 121 formed between the main body 100 and the cover 120 is scanned.

The controlling part 290 receives the signal from the document scanning button 250 and outputs the signal for operating the scanning sensor 210 and the transferring roller member driving motor 230.

Hereinafter, the scanning method of the A3 document will be described.

Firstly, the A3 document is aligned on the flat glass 110 by a user so that the short side portion (210 mm) of the A3 document is contacted with the transferring roller member 220 (S100), and then the document scanning button 250 is pushed (S200).

Then, the controlling part 290 receives the signal from the document scanning button 250 and outputs the signal to the scanning sensor 210 so as to scan a part of the A3 document 10 loaded on the flat glass 110. Therefore, the scanning sensor 210 is reciprocated at a lower side of the flat glass 110 so as to scan the A3 document loaded on the flat glass 110, and thus an about half (A4 size) of the A3 document is canned (S300).

Preferably, the scanning sensor 210 scans the A3 document to have a slightly larger size than a half (i.e., the A4 size) of the A3 document.

After desired time is passed, the controlling part 290 outputs a signal to the transferring roller member driving motor 230 so as to rotate the transferring roller member 220. If the transferring roller member 220 is rotated, the rest part of the A3 document that is not yet scanned is transferred to the side of the transferring roller member 220 and loaded on the flat glass 110, and the already scanned part of the A3 document is exposed to the outside through the document output port 122 formed between the main body 100 and the cover 120 (S400).

Then, the controlling part 290 outputs a signal to the scanning sensor 210 so as to scan the rest part of the A3 document loaded on the flat glass 110, and thus the scanning sensor 210 is reciprocated again at the lower side of the flat glass 110 so as to scan the A3 document loaded on the flat glass 110 (S500).

At this time, it is preferable that the scanning sensor 210 scans the A3 document to have a slightly larger size than a half of the A3 document. Therefore, in an image processing to be described, an overlapped portion in which the scanned images are overlapped with each other is formed and thus the two images can be smoothly composed.

If the scanning of the A3 document is finished, the image processing part 300 carries out the image processing so as to compose the scanned two images (having the A4 size) and generate an image of the A3 size (S600).

Therefore, the A3 document can be scanned by using the A4-size scanning sensor 210.

Figure 6:
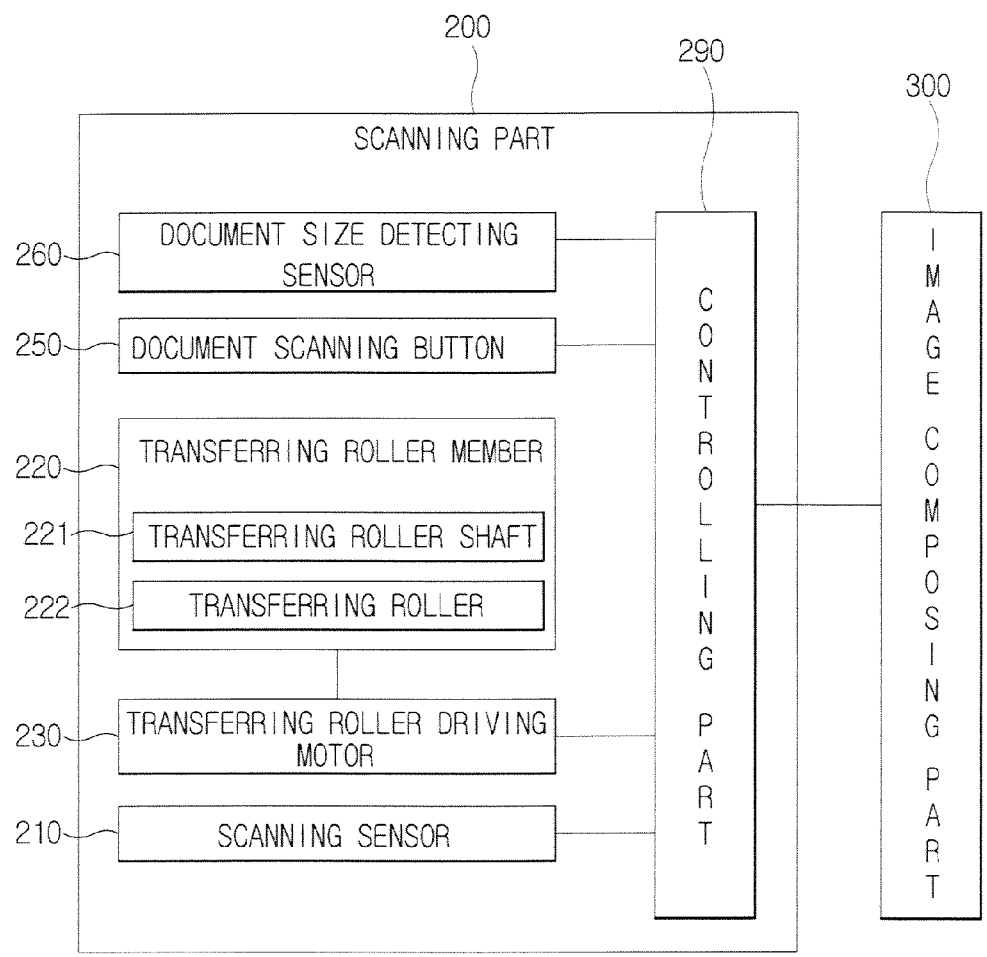
FIG. 6 is a block diagram showing other type of the scanning part the A4-size scanner with the function of scanning the A3 document in accordance with the first embodiment of the present invention.
Figure 7:
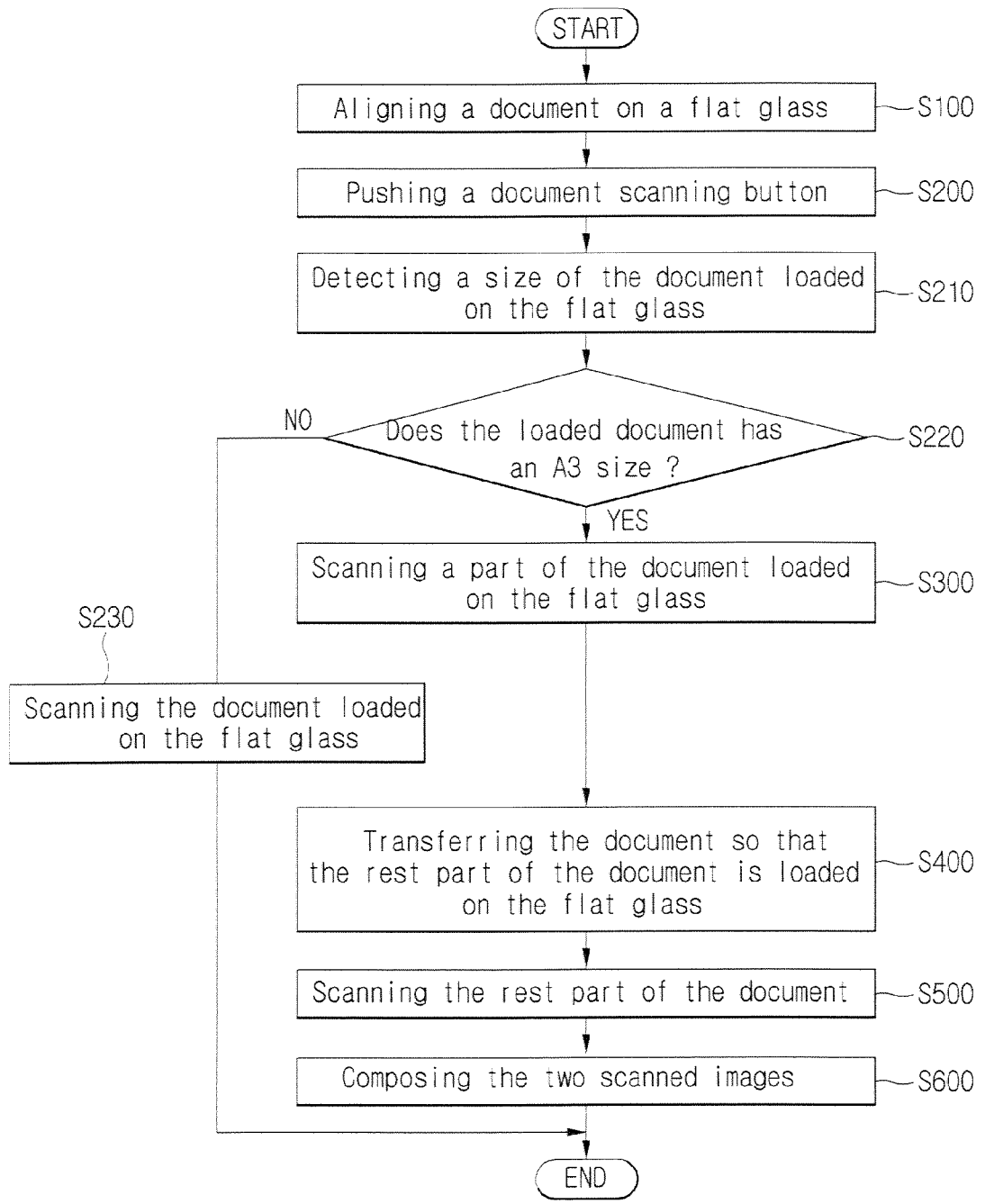
FIG. 7 is a flow chart showing other scanning method of the A4-size scanner with the function of scanning the A3 document in accordance with the first embodiment of the present invention.

FIG. 6 is a block diagram showing other type of the scanning part of the A4-size scanner with the function of scanning the A3 document in accordance with the first embodiment of the present invention, and FIG. 7 is a flow chart showing other scanning method of the A4-size scanner with the function of scanning the A3 document in accordance with the first embodiment of the present invention.

As shown in FIGS. 2 to 7, the scanning part 200 of the A4-size scanner with the function of scanning the A3 document in accordance with the first embodiment of the present invention further includes a document scanning button 250 which outputs a signal for performing the function of scanning the A3 document, a document size detecting sensor 260 for detecting a size of a document loaded on the flat glass 110 and a controlling part 290 which outputs a signal to the scanning part 200 so as to scan the A3 document according to the signals from the document scanning button 250 and the document size detecting sensor 260.

Although not shown in the drawings, the document scanning button 250 is provided at one side of the main body 100 to be pushed by a user so that the A3 document is scanned. The document scanning button 250 functions to output the signal to the controlling part 290 so that the A3 document loaded on the flat glass 110 through the document input port 121 formed between the main body 100 and the cover 120 is scanned.

The document size detecting sensor 260 is provided at the document input port 121 so as to detect a size of the document introduced through the document input port 121. At this time, if the document aligned on the flat glass 110 is exposed to the outside through the document input port 121, it is determined by the controlling part 290 that the document has the A3 size. And if the document aligned on the flat glass 110 is not exposed to the outside through the document input port 121, it is determined by the controlling part 430 that the document has the A4 size.

The controlling part 290 receives the signal from the document scanning button 250 and the document size detecting sensor 260 and outputs the signal for operating the scanning sensor 210 and the transferring roller member driving motor 230. Therefore, in case of the A3 document, the divided scanning is carried out.

Hereinafter, the scanning method of the A3 document will be described.

Firstly, the A3 document is aligned on the flat glass 110 by a user so that the short side (210 mm) of the document is contacted with the transferring roller member 220 (S100).

And, when the document scanning button 250 is pushed (S200), the document size detecting sensor 260 detects a size of the document aligned on the flat glass 110 and then outputs a signal to the controlling part 290 (S210).

Then, it is determined by the controlling part 290 whether the aligned document has the A3 size on the basis of the signal received from the document scanning button 260 (S220).

As a result, if the size of the document is over an extent of a scanning capacity of the scanning sensor 210, i.e., the A3 size, the controlling part 290 receives the signal from the document scanning button 250 and then outputs the signal to the scanning sensor 210 so as to scan a part of the A3 document 10 loaded on the flat glass 110.

And the scanning sensor 210 is reciprocated at a lower side of the flat glass 110 so as to scan the A3 document loaded on the flat glass 110. Therefore, a about half (A4 size) of the A3 document is scanned (S300).

Then, after desired time is passed, the controlling part 290 outputs a signal to the transferring roller member driving motor 230 so as to rotate the transferring roller member 220. If the transferring roller member 220 is rotated, the rest part of the A3 document that is not yet scanned is transferred to the side of the transferring roller member 220 and loaded on the flat glass 110, and the already scanned part of the A3 document is exposed to the outside through the document output port formed between the main body 100 and the cover 120 (S400).

Then, the controlling part 290 outputs a signal to the scanning sensor 210 so as to scan the rest part of the A3 document loaded on the flat glass 110, and thus the scanning sensor 210 is reciprocated again at the lower side of the flat glass 110 so as to scan the A3 document loaded on the flat glass 110 (S500).

If the scanning operation of the A3 document is finished, an image processing part 300 carries out the image processing operation so as to compose the scanned two image data and generate an image of the A4 size (S600).

On the other hand, as a result from the document size detecting sensor 260, if the size of the document is within an extent of the scanning capacity of the scanning sensor 210, i.e., the A4 size, the controlling part 290 receives the signal from the document scanning button 250 and then outputs the signal to the scanning sensor 210 so as to scan the A4 document 10 loaded on the flat glass 110.

And the scanning sensor 210 is reciprocated at the lower side of the flat glass 110 so as to scan the A4 document loaded on the flat glass 110. Therefore, the scanning of the A4 document is completed (S230).

As described above, it is possible to selectively scan the A4 or A3 document by controlling the operation of the scanning sensor 210 and the transferring roller driving motor 230.

Second Embodiment

Figure 8:
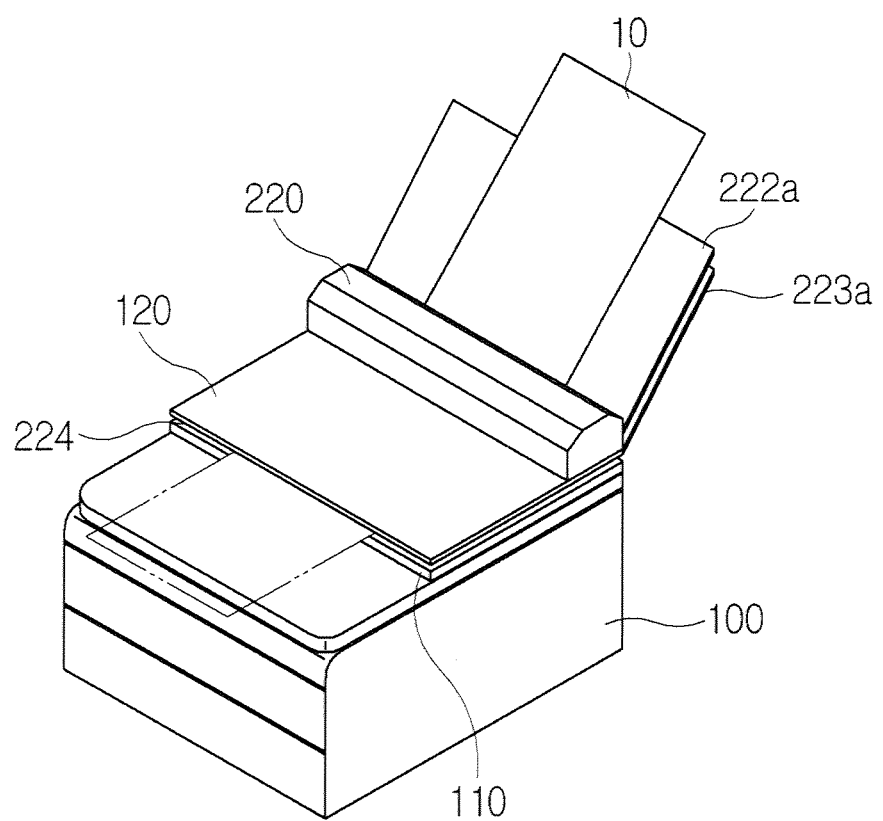
FIG. 8 is a perspective view of an A4-size scanner with a function of scanning an A3 document in accordance with a second embodiment of the present invention.
Figure 9:
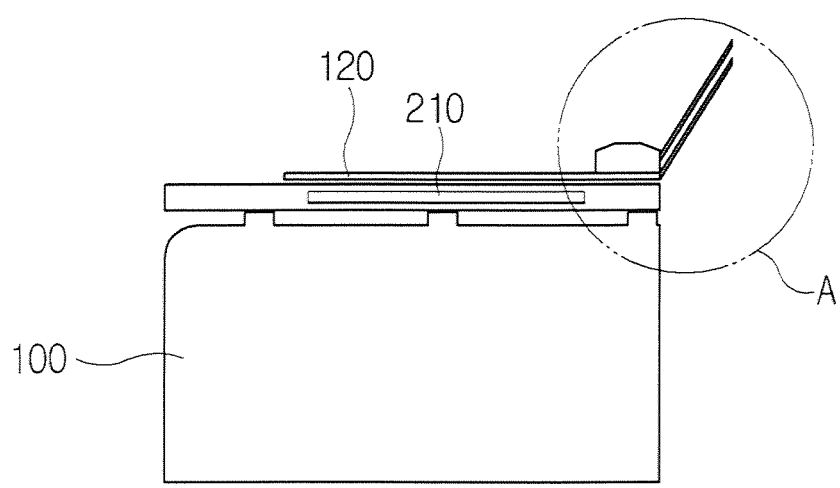
FIG. 9 is a side view of the A4-size scanner with the function of scanning the A3 document in accordance with the second embodiment of the present invention.
Figure 9A:
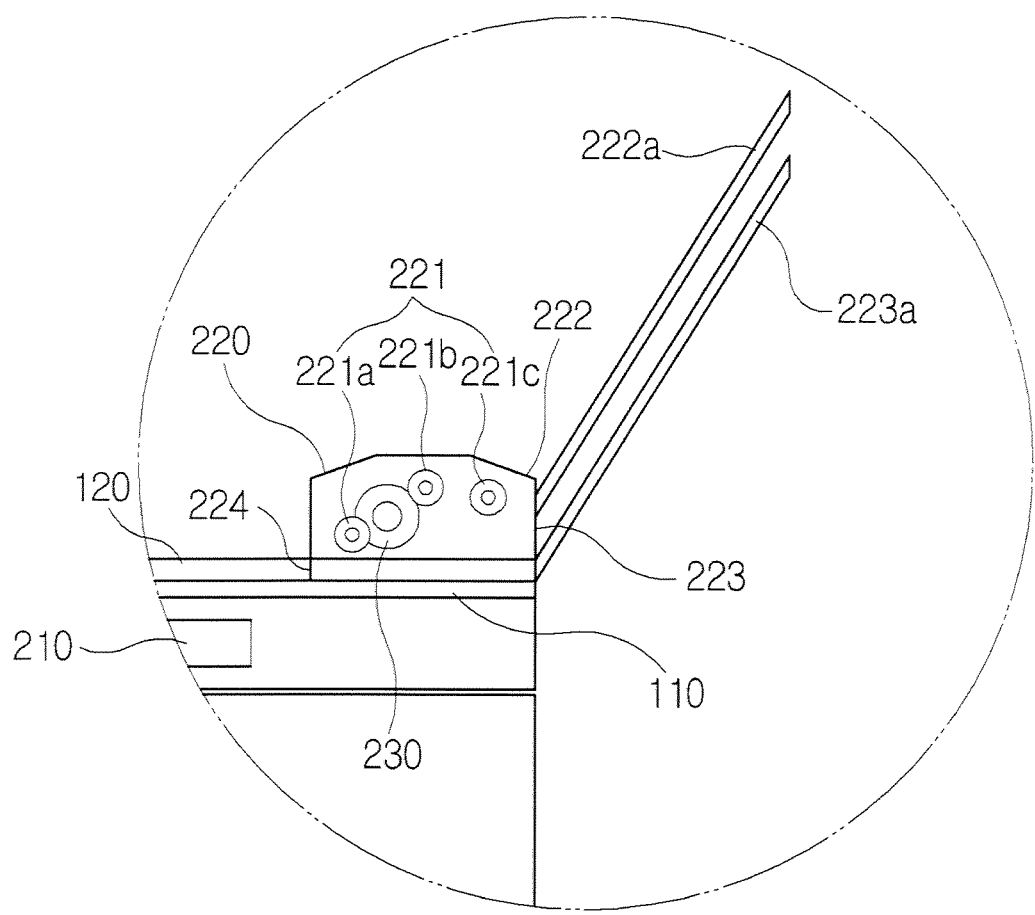
FIG. 9a is an enlarged view of a part A of FIG. 9.
Figure 10:
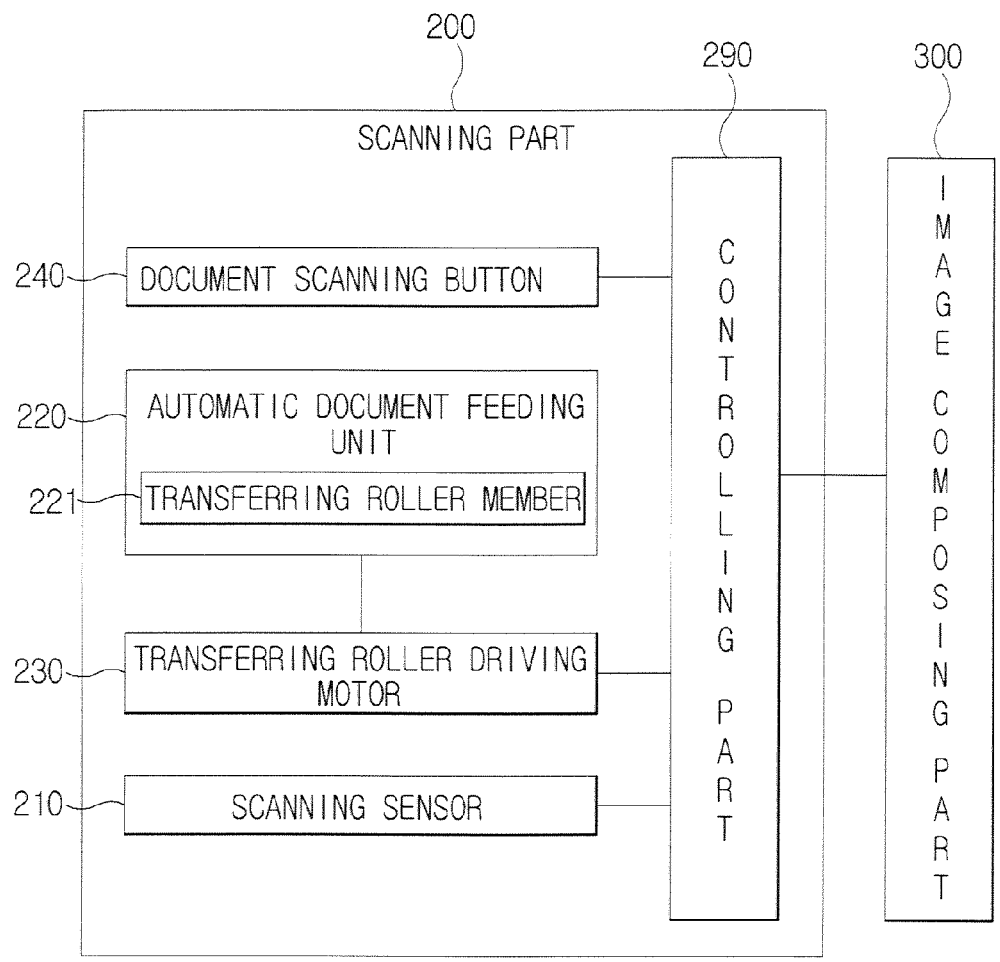
FIG. 10 is a schematic block diagram showing one type of a scanning part of the A4-size scanner with the function of scanning the A3 document in accordance with the second embodiment of the present invention.

FIG. 8 is a perspective view of an A4-size scanner with a function of scanning an A3 document in accordance with a second embodiment of the present invention, FIG. 9 is a side view of the A4-size scanner with the function of scanning the A3 document in accordance with the second embodiment of the present invention, FIG. 9*a* is an enlarged view of a part A of FIG. 9, and FIG. 10 is a schematic block diagram showing one type of a scanning part of the A4-size scanner with the function of scanning the A3 document in accordance with the second embodiment of the present invention.

As shown in FIGS. 8 to 10, the 4-size scanner with the function of scanning the A3-sized document in accordance with the second embodiment of the present invention includes an main body 100 having a flat glass 110 on which a document 10 is loaded and a cover 120 for opening and closing the flat glass 110 disposed at an upper side of the main body 100, and also includes a scanning part 200 which dividedly scans a document and an image processing part 300 for composing images which are dividedly scanned through the scanning part 200.

The scanning part 200 includes a scanning sensor 210, a transferring roller member 220, an automatic document feeding unit 220 which is provided one side of the cover 120, and a transferring roller member driving motor 230 for driving a transferring roller member 221 disposed in the automatic document feeding unit 220

The scanning sensor 210 includes a CCDM or CIS (CMOS Image Sensor) as a COD module. And the scanning sensor 210 is disposed at an upper side of the main body 100, detailedly, a lower side of the automatic document feeding unit 130 so as to scan the document fed from the automatic document feeding unit 130. Further, the scanning sensor 210 is reciprocated left and right so as to scan the document 10 loaded on the flat glass 110.

In general, the scanning sensor 210 is designed to be corresponding to a length (210 mm) of a short side portion of an A4 document. That is, the scanning sensor 210 is designed to scan the document along a long side portion (297 mm) of the A4 document in a status of being aligned be parallel with the short side portion (210 mm) of the A4 document.

The automatic document feeding unit 130 is disposed at a rear side of the cover 120, i.e., at an upper side of the scanning sensor 210 so as to automatically feed and discharge a large amount of documents.

In detail, the automatic document feeding unit 220 has a plurality of transferring rollers 221a, 221b and 221c therein. At a rear side of the automatic document feeding unit 220, there are provided a document feeding port 222 and a document discharging port 223 which are disposed up and down to be spaced apart from each other in a desired distance, and at a front side thereof, there are formed a document exposing port 224 through which a part of the document fed through the document feeding port 222 is exposed to an outside of the flat glass 110.

Further, at a rear side of the document feeding port 222 and the document discharging port 223, there are provided a document feeding stand 222a and a document discharging stand 223a which are extended upward to be inclined at a desired angle.

The transferring roller member 221 is disposed in the automatic document feeding unit 220 to be adjacent to the document feeding port 222. The transferring roller member 221 includes a feeding roller 221b, 221c for feeding the document loaded on the document feeding stand 222a to the flat glass 110, and a transferring roller 221a which is disposed to be adjacent to the document exposing port 224 and functions to adapt the fed document to be exposed to an outside of the document exposing port 224 or discharged to the document discharging stand 223a through the document discharging port 223.

At this time, the transferring roll 221a is rotated forwardly and reversely by the transferring roller member driving motor 230 so that the fed document is transferred to the side of the document exposing port 224 or the document discharging port 223.

The transferring roller member driving motor 230 is connected to the feeding roller 221b, 221c and the transferring roller 221a through a plurality of gears not shown) so as transmit driving force to the feeding roller 221b, 221c and the transferring roller 221a. Also, transferring roller member driving motor 230 functions transmit the driving force to the transferring roller 221a so that the transferring roller 221a can be rotated forwardly and reversely.

In case of scanning the A3 document, by rotation of the transferring roller 221a, a part of the A3 document loaded at the document feeding port 222 is closely contacted with the flat glass 110 and the rest part thereof is positioned at an outside of the flat glass 110, and then the document on the flat glass 110 is scanned by the scanning sensor 210. After that, the transferring roller 221a is rotated again and the rest part of the A3 document that is not yet scanned is closely contacted with the flat glass 110, and the scanning sensor 210 scans the rest part of the A3 document loaded on the flat glass 110. Then, the transferring roller 221a is rotated again so that the completely scanned document is discharged through the document discharging port 223 to the outside.

Therefore, the scanning sensor 210 is reciprocated twice so as to scan the entire parts of the A3 document. That is, it is possible to scan the A3 document having a double size of the A4 document using the A4-size scanning sensor 210.

The image processing part 300 carries out a typical image processing for composing two images (A4-size images) scanned through the scanning part 200 and then generates a scanned image of the A3 size.

As described above, the A4-size scanner having the function of scanning an A3 document in accordance with the second embodiment of the present invention can scan the A3 document using the existing (A4-size) scanning sensor.

Figure 11:
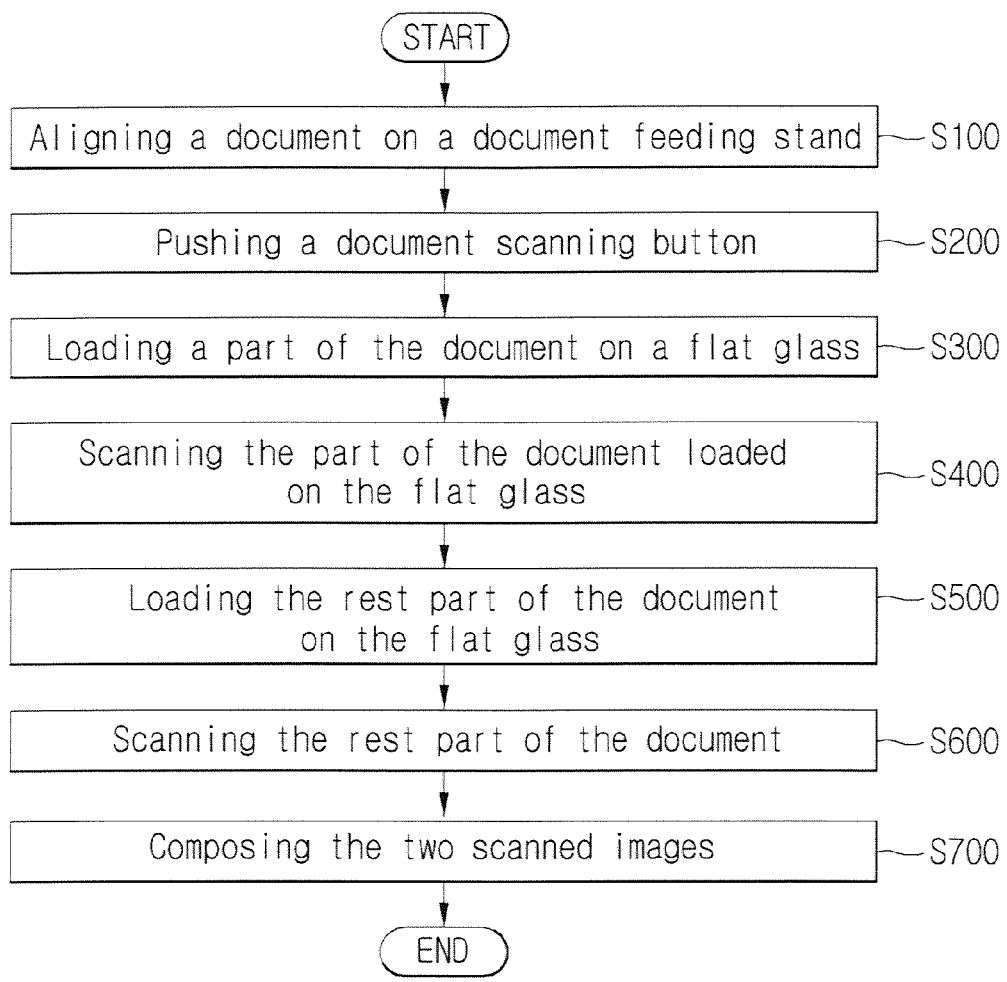
FIG. 11 is a flow chart showing a scanning method of the A4-size scanner with the function of scanning the A3 document in accordance with the second embodiment of the present invention.

FIG. 11 is a flow chart showing a scanning method of the A4-size scanner with the function of scanning the A3 document in accordance with the second embodiment of the present invention, and FIGS. 12a to 12d are perspective views schematically showing scanning processes of the A4-size scanner with the function of scanning the A3 document in accordance with the second embodiment of the present invention.

As shown in FIGS. 8 to 12d, the scanning part 200 of the A4-size scanner with the function of scanning the A3 document in accordance with the second embodiment of the present invention further includes a document scanning button 240 which outputs a signal for performing the function of scanning the A3 document and a controlling part 290 which outputs a signal to the scanning part 200 so as to scan the A3 document according to the signal from the document scanning button 240.

Although not shown in the drawings, the document scanning button 240 is provided at one side of the main body 100 to be pushed by a user so that the A3 document is scanned. The document scanning button 240 functions to output a signal to the controlling part 290 so that the A3 document loaded on the flat glass 110 through the automatic document feeding unit 220 is scanned.

The controlling part 290 receives the signal from the document scanning button 240 and outputs the signal for operating the scanning sensor 210 and the transferring roller member driving motor 230.

Hereinafter, the scanning method of the A3 document will be described.

Figure 12A:
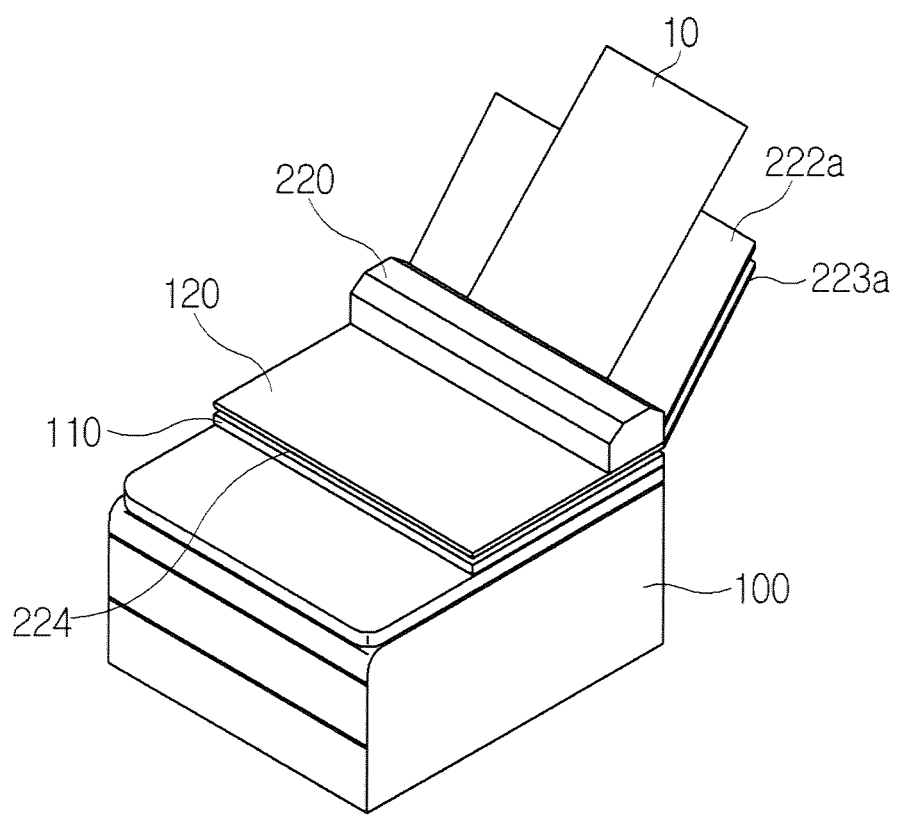
FIGS. 12a to 12d are perspective views schematically showing scanning processes of the A4-size scanner with the function of scanning the A3 document in accordance with the second embodiment of the present invention.

As shown in FIG. 12a, firstly, after the A3 document is aligned on the document feeding stand 222a of the automatic document feeding unit 220 by a user (S100), the document scanning button 240 is pushed (S200).

Figure 12B:
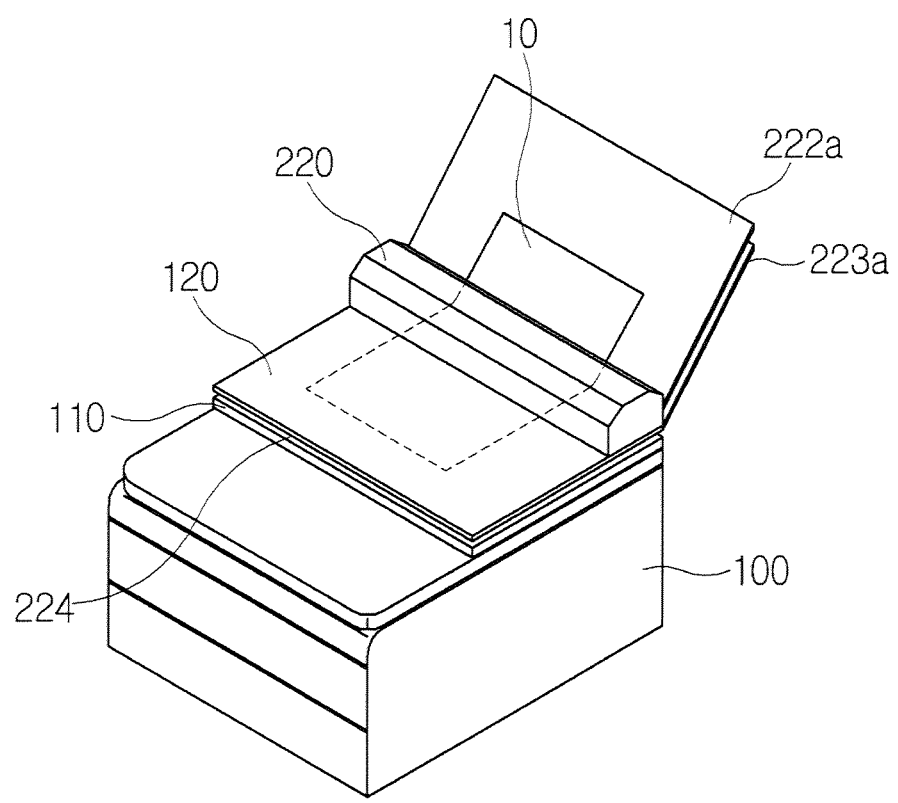

Then, the controlling part 290 receives a signal from the document scanning button 240 and outputs a signal to the transferring roller member driving motor 230 so as to drive the transferring roller member 221. Therefore, as shown in FIG. 12b, the transferring roller 221a is rotated forwardly so that an about half of the document 10 loaded on the document feeding stand 222a is closely contacted with the flat glass 110 and the rest part is loaded on the document feeding stand 222a (S300).

At the same time, the controlling part 290 outputs a signal to the scanning sensor to scan a part of the A3 document 10 closely contacted with the flat glass 110. Thus, the scanning sensor 210 is reciprocated left and right so as to primarily scan a part of the A3 document 10 (S400).

Preferably, the scanning sensor 210 scans the A3 document to have a slightly larger size than a half (i.e., the A4 size) of the A3 document.

If desired time is passed after the primary scanning, the controlling part 290 outputs again the signal to the transferring roller member driving motor 230 so as to rotate the transferring roller member 221.

Figure 12C:
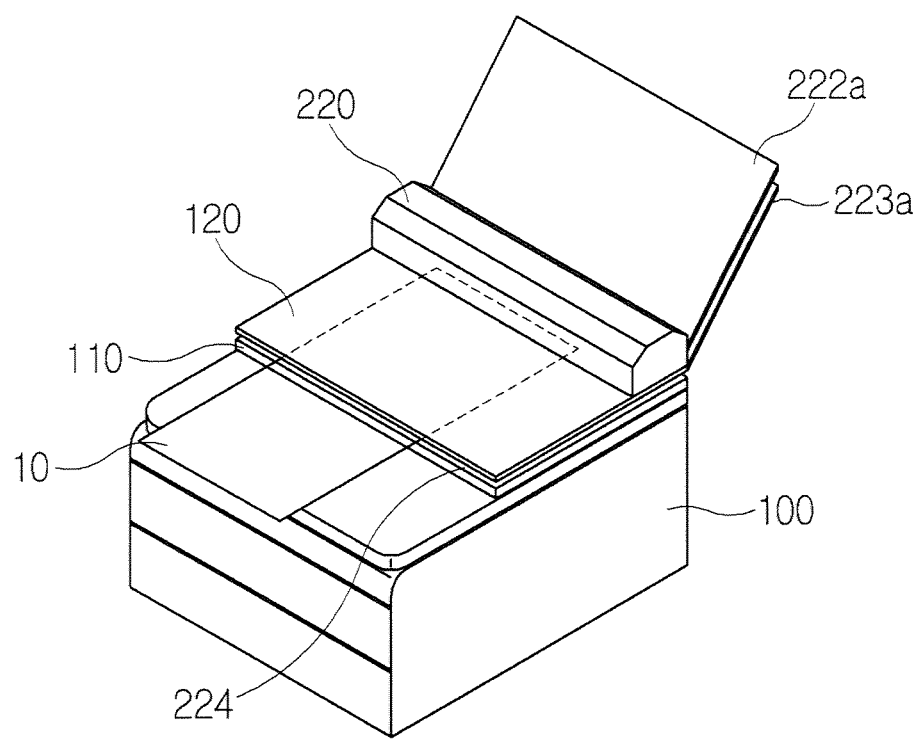

Then, as shown in FIG. 12c, the transferring roller member 220 is rotated forwardly so that the already scanned part of the A3 document is exposed to an outside of the document exposing port 224 and the rest part of the A3 document that is not yet scanned is loaded on the flat glass 110 (S500).

At the same time, the controlling part 290 outputs a signal to the scanning sensor 210 so as to scan the rest part of the A3 document loaded on the flat glass 110, and thus the scanning sensor 210 is reciprocated again at the lower side of the flat glass 110 so as to secondly scan the A3 document loaded on the flat glass 110 (S600).

Preferably, the scanning sensor 210 scans the A3 document to have a slightly larger size than a half of the A3 document. Therefore, in an image processing to be described, an overlapped portion in which the scanned images are overlapped with each other is formed and thus the two images can be smoothly composed.

Figure 12D:
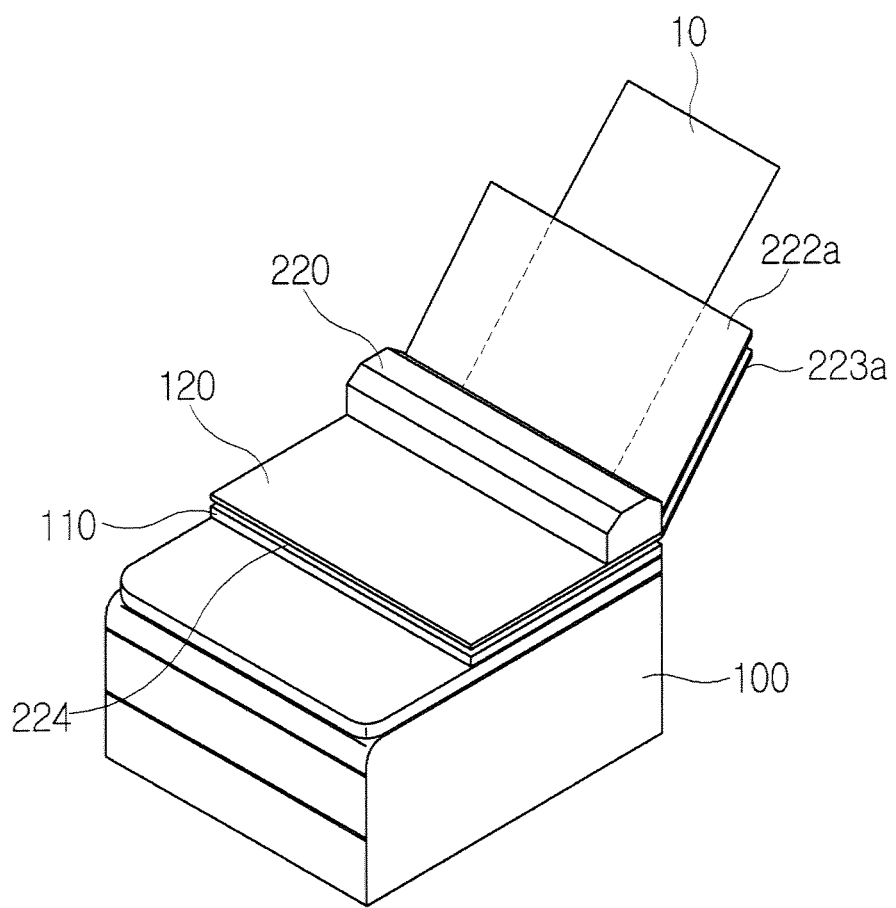

After the two scanning operations are completed, the controlling part 290 outputs a signal to the transferring roller 221a to be rotated reversely. Thus, as shown in FIG. 12d, while the transferring roller 221a is rotated reversely, the A3 document 10 is discharged through the document discharging port 223 and the loaded on the document discharging stand 223a.

if the divided scanning operations of the A3 document are finished, the image processing part 300 carries out the image processing so as to compose the scanned two images (having the A4 size) and generate an image of the A3 size.

Therefore, the A3 document can be scanned by using the A4-size scanning sensor 210.

Otherwise, the A4-size scanner with the function of scanning the A3 document in accordance with the second embodiment of the present invention can performed the divided scanning operation, as shown in FIGS. 13a to 13d.

Figure 13A:
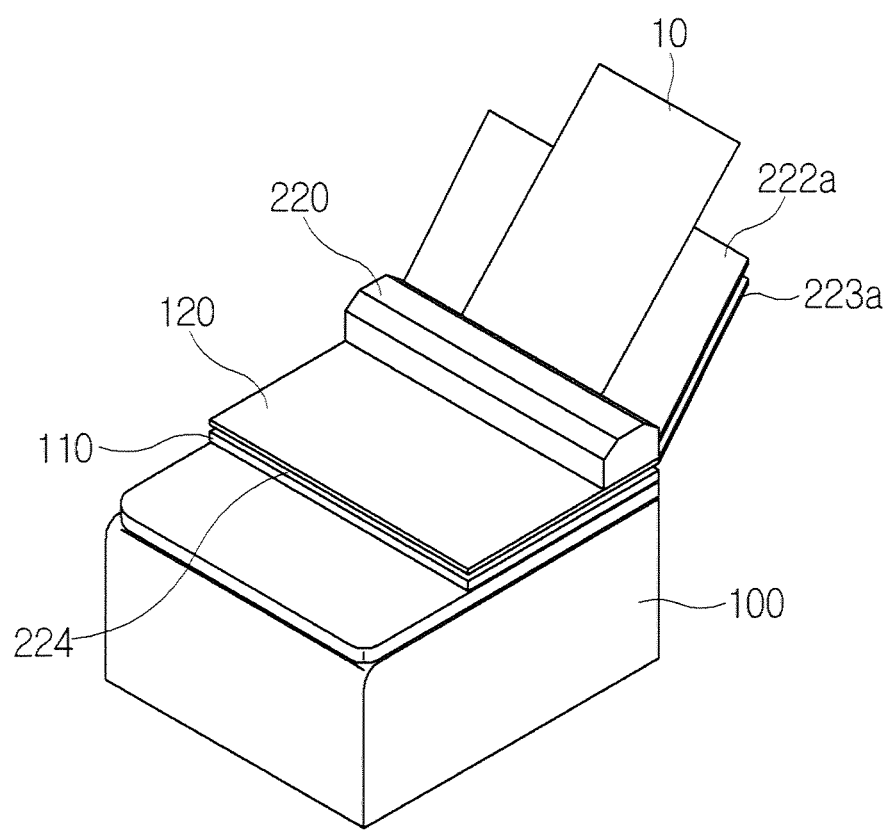
FIGS. 13a to 13d are perspective views schematically showing other scanning processes of the A4-size scanner with the function of scanning the A3 document in accordance with the second embodiment of the present invention.

As shown in FIG. 13a, firstly, when the document scanning button 240 is pushed after the A3 document is aligned on the document feeding stand 222a of the automatic document feeding unit 220 by a user, the controlling part 290 receives a signal from the document scanning button 240 and outputs a signal to the transferring roller member driving motor 230 so as to drive the transferring roller member 221.

Figure 13B:
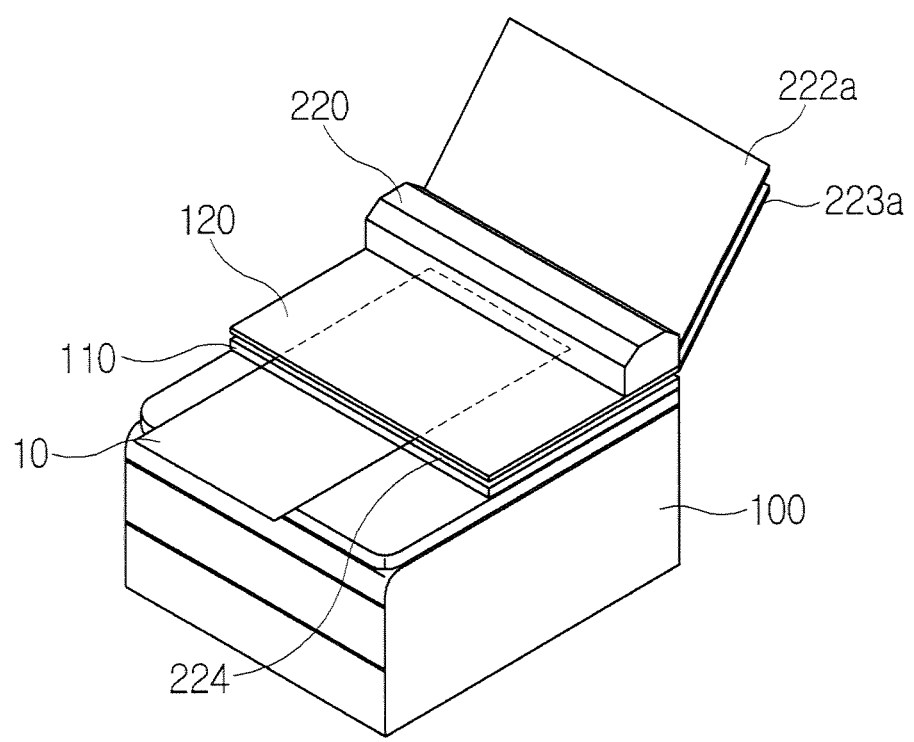

Then, as shown in FIG. 13b, the transferring roller 221a is rotated forwardly so that an about half of the document 10 loaded on the document feeding stand 222a is closely contacted with the flat glass 110 and the rest part thereof is exposed to an outside of the document exposing port 224.

At the same time, the controlling part 290 outputs a signal to the scanning sensor to scan a part of the A3 document 10 closely contacted with the flat glass 110. Thus, the scanning sensor 210 is reciprocated left and right so as to primarily scan a part of the A3 document 10.

If desired time is passed after the primary scanning, the controlling part 290 outputs again the signal to the transferring roller member driving motor 230 so as to rotate the transferring roller member 221.

Figure 13C:
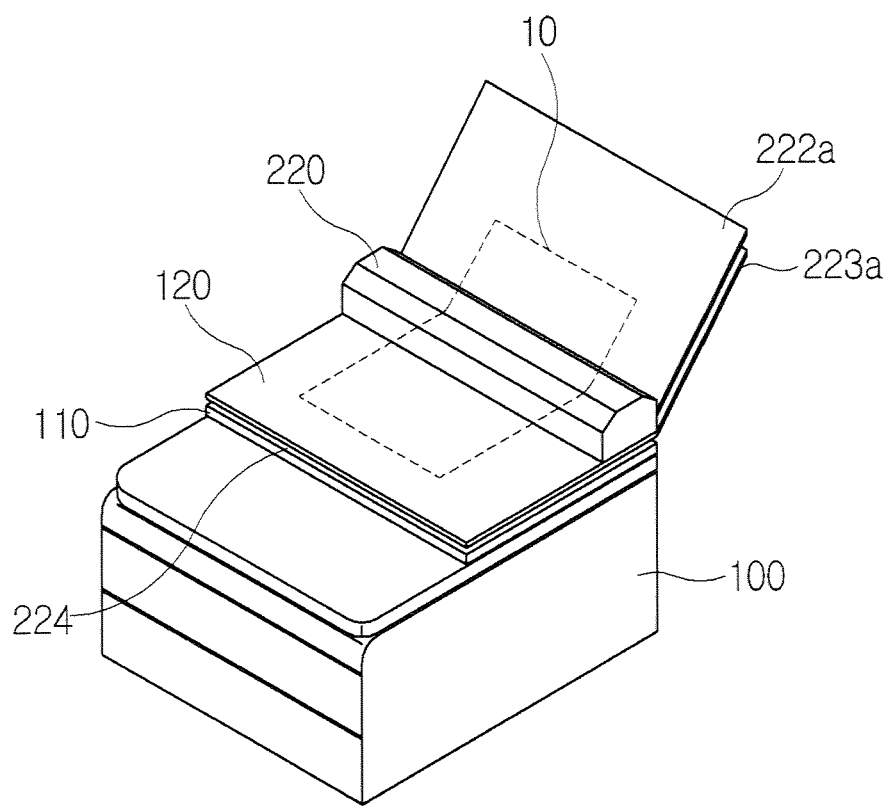

Then, as shown in FIG. 13c, the transferring roller member 220 is rotated reversely so that the A3 document 10 is moved backward and the already scanned part of the A3 document is positioned at an inner side of the automatic document feeding unit 220 and the rest part of the A3 document that is not yet scanned is loaded on the flat glass 110.

At the same time, the controlling part 290 outputs a signal to the scanning sensor 210 so as to scan the rest part of the A3 document loaded on the flat glass 110, and thus the scanning sensor 210 is reciprocated again at the lower side of the flat glass 110 so as to secondly scan the A3 document loaded on the flat glass 110.

Figure 13D:
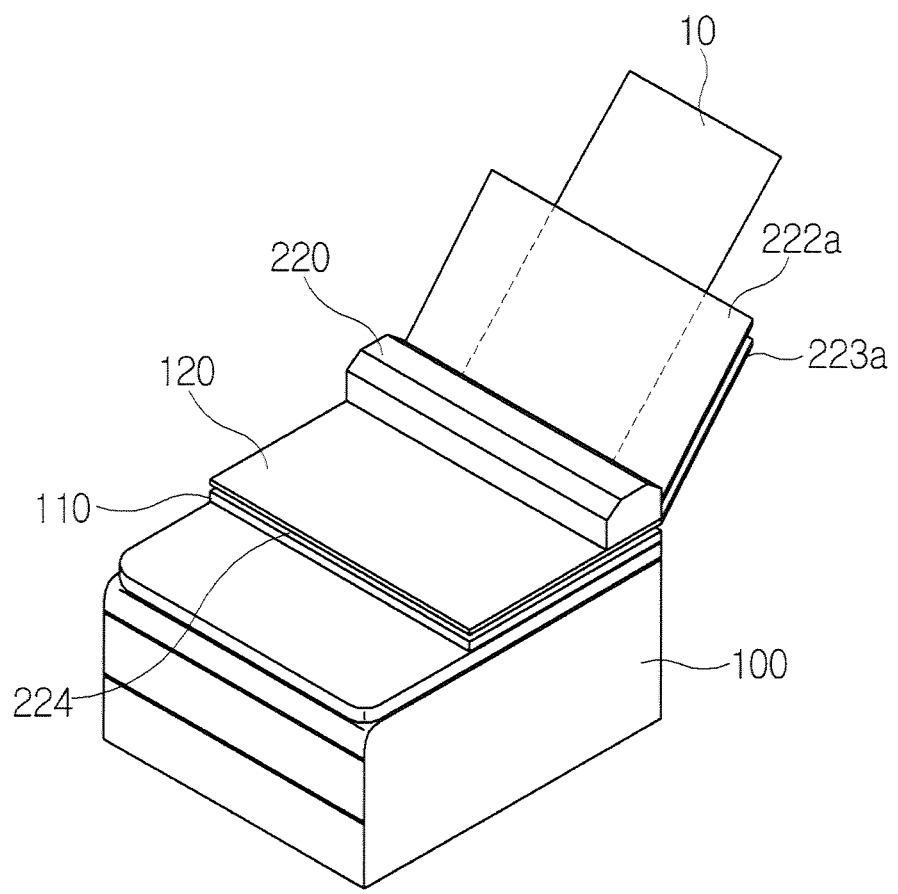

After the two scanning operations are completed, the controlling part 290 outputs a signal to the transferring roller 221a to be rotated reversely. Thus, as shown in FIG. 13d, while the transferring roller 221a is rotated reversely, the A3 document 10 is discharged through the document discharging port 223 and the loaded on the document discharging stand 223a.

If the divided scanning operations of the A3 document are finished, the image processing part 300 carries out the image processing so as to compose the scanned two images (having the A4 size) and generate an image of the A3 size.

Therefore, the A3 document can be scanned by using the A4-size scanning sensor 210.

Figure 14:
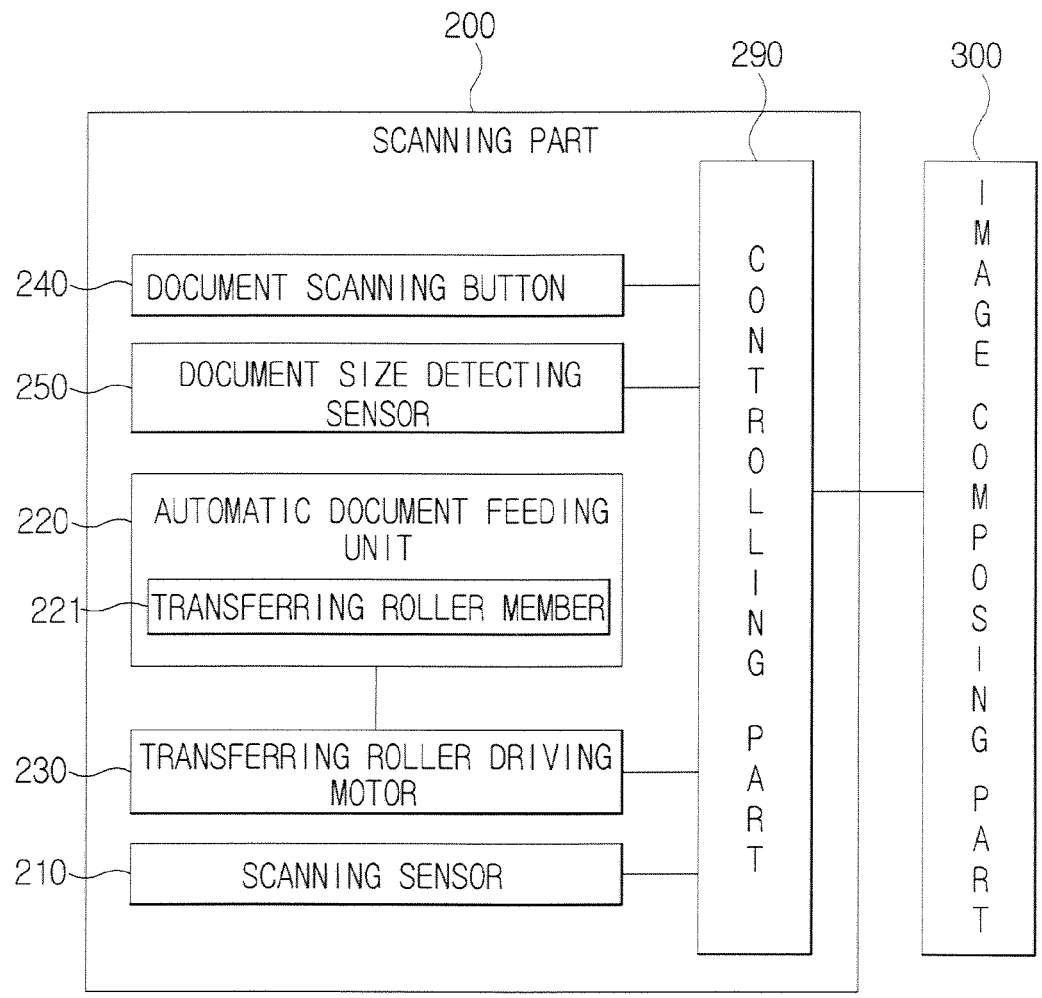
FIG. 14 is a block diagram showing other type of the scanning part of the A4-size scanner with the function of scanning the A3 document in accordance with the second embodiment of the present invention.
Figure 15:
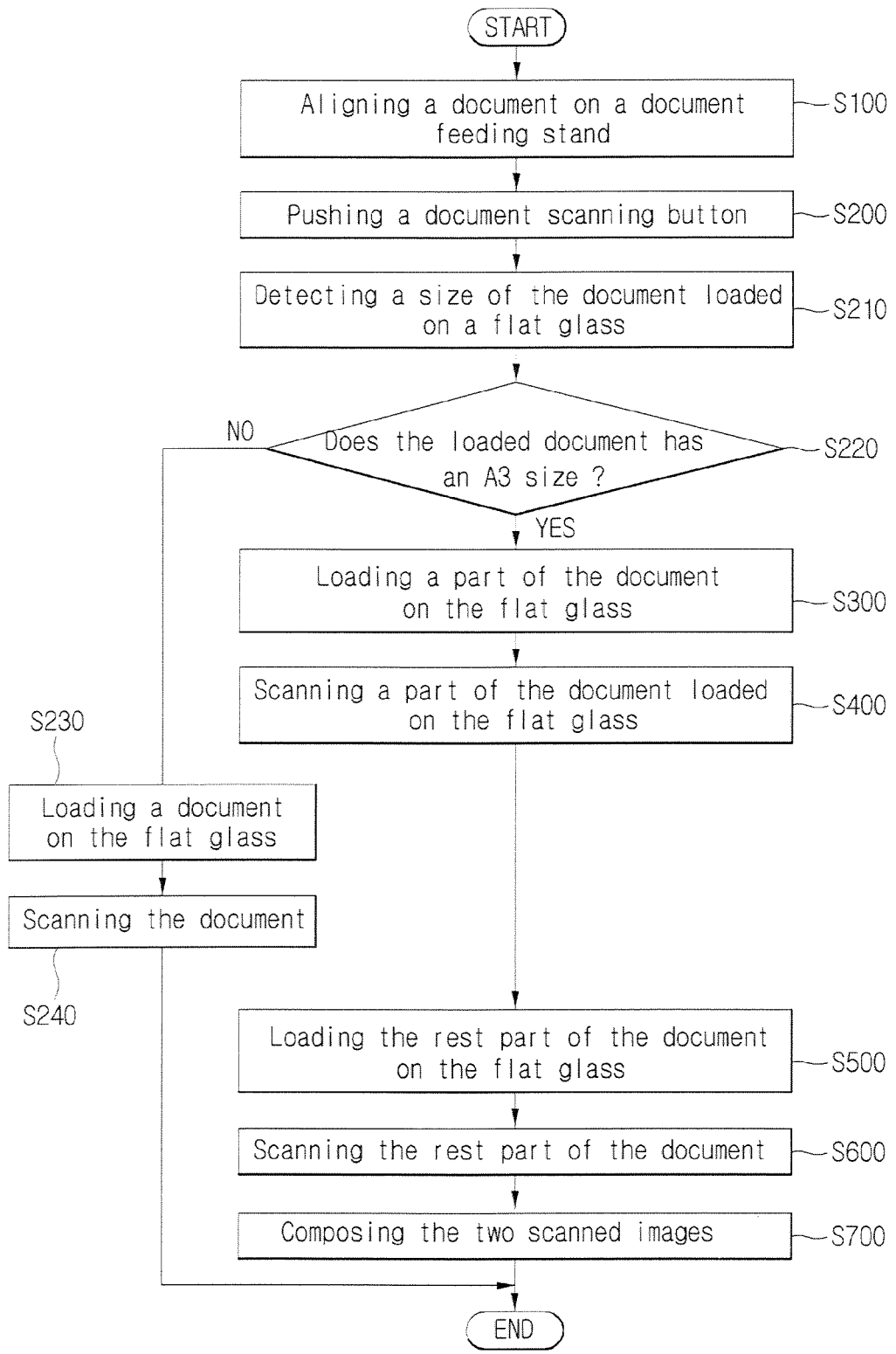
FIG. 15 is a flow chart showing other scanning method of the A4-size scanner with the function of scanning the A3 document in accordance with the second embodiment of the present invention.

FIG. 14 is a block diagram showing other type of the scanning part of the A4-size scanner with the function of scanning the A3 document in accordance with the second embodiment of the present invention, and FIG. 15 is a flow chart showing other scanning method of the A4-size scanner with the function of scanning the A3 document in accordance with the second embodiment of the present invention.

As shown in the drawings, the scanning part 200 of the A4-size scanner with the function of scanning the A3 document in accordance with the second embodiment of the present invention further includes a document scanning button 240 which outputs a signal for performing the function of scanning the A3 document, a document size detecting sensor 250 for detecting a size of a document loaded on the flat glass 110 and a controlling part 290 which outputs a signal to the scanning part 200 so as scan the A3 document according to the signals from the document scanning button 240 and the document size detecting sensor 250.

Although not shown in the drawings, the document size detecting sensor 250 is provided at the document feeding stand 222a so as to detect a size of the document loaded on the document feeding stand 222a. At this time, if the document aligned on the document feeding stand 222a is exposed to the outside of the document feeding stand 222a, it is determined by the controlling part 290 that the document has the A3 size. And if the document aligned on the flat glass 110 is not exposed to the outside of the document feeding stand 222a, it is determined by the controlling part 430 that the document has the A4 size.

The controlling part 290 receives the signal from the document scanning button 240 and the document size detecting sensor 250 and outputs a signal for operating the scanning sensor 210 and the transferring roller member driving motor 230. Therefore, in case of the A3 document, the divided scanning is carried out.

The scanning method of the A4 scanner having the function of scanning the A3 document further including the document size detecting sensor 250 as shown in FIGS. 14 and 15 the same as that of the flow chart of FIG. 11, but further includes the following steps after the document scanning button 240 is pushed.

In detail, if the user pushes the document scanning button 240 (S200), the document size detecting sensor 250 a size of the document aligned on the detects a size of the document aligned on the document feeding stand 222a and then outputs a signal to the controlling part 290 (S210).

Then, it is determined by the controlling part 290 whether the aligned document has the A3 size on the basis of the signal received from the document scanning button 260 (S220).

As a result, if the size of the document is over an extent of a scanning capacity the scanning sensor 210, the A3 size, the controlling part 290 receives the signal from the document scanning button 240 and then outputs a signal to the transferring roller member driving motor 230 so as to drive the transferring roller member 221.

Then, the transferring roller 221a is rotated forwardly, and an about half of the document 10 loaded on the document feeding stand 222a is closely contacted with the flat glass 110 (S300).

Subsequently, the steps S300 to S700 as described above are carried out so as to dividedly scan the A3 document and generate an image of A3 size.

Meanwhile, as a result of the S220, if the size of the document is within an extent of a scanning capacity the scanning sensor 210, i.e., the A4 size, the controlling part 290 outputs a signal to the transferring roller member driving motor 230 so as to drive the transferring roller member 221. Thus, the A document is loaded on the flat glass 110 (S230).

And the controlling part 290 outputs a signal to the scanning sensor 210 so as to scan the A4 document loaded on the flat glass 110, and thus the scanning sensor 210 is reciprocated left and right so as to scan the A4 document loaded on the flat glass 110 (S240).

As described above, the A4 or A3 document can be selectively scanned by controlling the scanning sensor 210 and the transferring roller member driving motor 230.

The present invention can be also applied to any other scanner which scans a document having a double size of a scanning capacity of its scanning sensor, for example, a scanner for scanning an A2 document using an A3-size scanner.

According to the A4-size scanner having a function of scanning an A3 document and the scanning method thereof, it is possible to scan the A3 document with the A4-size scanner.

Further, according to the present invention, it is possible to remarkably reduce a manufacturing cost of the product.

While the present invention has been described with respect to the specific embodiments, it will be apparent to those skilled in the art that various changes and modifications may be made without departing from the spirit and scope of the invention as defined in the following claims.

What is claimed is:

1. An A4-size scanner capable of scanning an A3 document, the scanner including a main body having a flat glass on which a document is loaded, and a cover for opening and closing the main body, comprising:
   a scanning part which dividedly scans the document having a larger size than a scanning capacity, and which comprises a scanning sensor that is disposed in the main body so as to scan the document; an automatic document feeding unit having a transferring roller member which is provided at a rear side of the cover and comprised of a plurality of rollers, a document feeding port and a document discharging port which are formed at a rear side of the automatic document feeding unit to be parallelly formed up and down, and a document exposing port which is formed at a front side of the automatic document feeding unit so that a part of the document fed through the document feeding port is exposed to an outside of the flat glass; and a transferring roller member driving motor which transmits driving force to the transferring roller member so that the transferring roller member is rotated forwardly and reversely; and
   an image processing part which performs an image processing for composing two images which are dividedly scanned through the scanning part.

2. The A4-size scanner of claim 1, wherein the transferring roller member comprises a feeding roller which is disposed to be adjacent to the document feeding port, and a transferring roller which is disposed to be adjacent to the document exposing port, and
   the transferring roller is rotated forwardly and reversely by the transferring roller member driving motor so that the fed document is transferred to the document exposing port or the document discharging port.

3. The A4-size scanner of claim 2, wherein the scanning port comprises document scanning button which outputs a signal for scanning the document loaded at the document feeding port; and a controlling part which receives a signal from the document scanning button and outputs a signal for operating the scanning sensor and the transferring roller member driving motor,
   wherein the controlling part outputs a signal to the scanning sensor and the transferring roller member driving motor according to the signal from the document scanning button so that the document loaded on the flat glass is dividedly scanned.

4. The A4-size scanner of claim 3, wherein the scanning part further comprises a document size detecting sensor which is disposed at a document input port so as to detect a size of the document introduced onto the flat glass, and
   the controlling part outputs a signal to the scanning sensor and the transferring roller member driving motor according to the signal of the document scanning button and a result detected by the document size detecting sensor so that the document loaded on the flat glass is selectively and dividedly scanned.

5. The A4-size scanner of claim 4, wherein the scanning sensor scans a half or more of the document in case of dividedly scanning the document so that an overlapped portion in which the scanned images are overlapped with each other is formed.

6. A method of using the scanner of claim 1, comprising the steps of:
   a) aligning a short side portion of a document on a document feeding port;
   b) pushing a document scanning button;
   c) outputting a signal from a controlling part to a transferring roller member driving motor according to a signal of the document scanning button so that a part of the document aligned at the document feeding port is closely contacted with the flat glass;
   d) outputting a signal from the controlling part to a scanning sensor so as to scan the part of the document loaded on the flat glass;
   e) outputting a signal from the controlling part to the transferring roller member driving motor so that the rest part of the document that is not yet scanned is loaded on the flat glass;
   f) outputting a signal from the controlling part to the scanning sensor so as to scan the rest part of the document; and g) performing an image processing in an image processing part so as to compose two images scanned by the scanning sensor.

7. The scanning method of claim 6, further comprising the step of detecting a size of the document aligned on the flat glass by a document size detecting sensor between the steps of b and c, wherein the controlling part carries out the steps of c, d, e, f and g, if the document aligned on the flat glass has a larger size of a scanning capacity of the scanning sensor.

8. The scanning method of claim 7, wherein the scanning sensor scans a half or more of the document so that an overlapped portion in which the scanned images are overlapped with each other is formed.

9. An A4-size scanner for scanning both an A4 document and an A3 document, the A3 document has a greater length and width than the A4 document, the scanner comprising:

a main body with flat glass mounted thereto, the flat glass extending further in a length direction than in a width direction;

a cover mounted to the main body over the flat glass;

a scanning sensor proximate to the flat glass, the scanning sensor extends generally parallel to the width direction of the flat glass and is configured to move across the flat glass in the length direction;

an automatic document feeding unit extending parallel to the width direction of the flat glass and configured to transport the A4 document to the flat glass along the length direction of the flat glass;

a transferring roller member including a transferring roller shaft with a transferring roller mounted thereto, the transferring roller shaft extends generally parallel to the length direction of the flat glass and generally orthogonal to the width direction of the flat glass;

an input port and an output port at opposite sides of the cover, the input port and the output port define a transport path extending therebetween and across the flat glass in the width direction;

a driving unit configured to drive both the automatic document feeding unit and the transferring roller member;

an image processing part configured to combine a first scanned image of a first portion of the A3 document fed lengthwise through the input port and seated on the flat glass with a second scanned image of a second portion of the A3 document to produce a single image of the A3 document, the transferring roller mechanism moves the A3 document from a first position at which the first portion is scanned to a second position at which the second portion is scanned, the second portion is offset from the flat glass when the first portion is scanned.

10. The scanner of claim 9, wherein the transferring roller mechanism moves the A3 document along the transport path and along the width direction of the flat glass when moving the A3 document from the first position to the second position.

11. The scanner of claim 9, further comprising a spring member coupled to the transferring roller shaft and configured to exert force against the transferring roller shaft to decouple the transferring roller shaft from the driving unit when the scanner is scanning the A4 document.

* * * * *